(12) United States Patent
VanSickel et al.

(10) Patent No.: US 11,490,166 B2
(45) Date of Patent: Nov. 1, 2022

(54) SYSTEMS AND METHODS FOR PROGRAM SOURCE DISPLAY

(71) Applicant: Sling TV L.L.C., Englewood, CO (US)

(72) Inventors: Seth VanSickel, Englewood, CO (US); Zachary Orner, Englewood, CO (US)

(73) Assignee: Sling TV L.L.C., Englewood, CO (US)

( * ) Notice: Subject to any disclaimer, the term of this patent is extended or adjusted under 35 U.S.C. 154(b) by 0 days.

(21) Appl. No.: 16/727,823

(22) Filed: Dec. 26, 2019

(65) Prior Publication Data
US 2021/0204032 A1 Jul. 1, 2021

(51) Int. Cl.
*H04N 7/10* (2006.01)
*H04N 21/482* (2011.01)
*H04N 21/442* (2011.01)
*H04N 21/462* (2011.01)
*H04N 21/475* (2011.01)

(52) U.S. Cl.
CPC ... *H04N 21/4821* (2013.01); *H04N 21/44245* (2013.01); *H04N 21/4622* (2013.01); *H04N 21/4755* (2013.01); *H04N 21/4828* (2013.01)

(58) Field of Classification Search
CPC ............ H04N 21/812; H04N 21/4331; H04N 21/4532; H04N 21/235; H04N 21/435; H04N 21/437; H04N 21/458; H04N 21/4583; H04N 21/814; H04N 21/8146; H04N 21/44222; H04N 21/2581; H04N 21/25883; H04N 21/4821; H04N 21/4755; H04N 21/4828; H04N 21/4622; H04N 21/44245
See application file for complete search history.

(56) References Cited

U.S. PATENT DOCUMENTS

| | | | | |
|---|---|---|---|---|
| 6,999,477 B1* | 2/2006 | Oz | ..................... | H04N 21/4263 348/E7.071 |
| 2002/0054087 A1* | 5/2002 | Noll | ................... | H04N 21/4782 715/744 |
| 2002/0057297 A1* | 5/2002 | Grimes | ............... | G06F 16/9577 715/810 |
| 2004/0148629 A1* | 7/2004 | Shibamiya | ............ | G06F 3/0488 725/53 |
| 2005/0132295 A1* | 6/2005 | Noll | ................. | H04N 21/44222 715/744 |
| 2007/0130595 A1* | 6/2007 | McElhatten | ....... | H04N 21/6587 725/88 |
| 2007/0240190 A1* | 10/2007 | Arseneau | ............... | H04N 5/445 725/81 |
| 2008/0244671 A1* | 10/2008 | Moon | ................ | H04N 21/4722 725/110 |

(Continued)

*Primary Examiner* — Annan Q Shang
(74) *Attorney, Agent, or Firm* — Perkins Cole LLP

(57) ABSTRACT

The present disclosure is directed to systems and methods for displaying a program source indicator. A program may be selected within an electronic program guide. Metadata associated with the program may be received, wherein the metadata comprises a source identifier. A source identifier may be an Internet-streaming service, a broadband TV service, a satellite TV service, and/or a digital video recorder database. Based on the source identifier, a source indicator may be retrieved. A program source indicator may be a superimposed image, icon, or other visual indicator. The source indicator may then be temporarily overlaid on the program content within the electronic programming guide.

20 Claims, 5 Drawing Sheets

(56) References Cited

U.S. PATENT DOCUMENTS

| | | | |
|---|---|---|---|
| 2008/0320158 A1* | 12/2008 | Simonds | H04N 21/454 709/231 |
| 2009/0138805 A1* | 5/2009 | Hildreth | H04N 21/4751 715/745 |
| 2010/0023635 A1* | 1/2010 | Labonte | H04L 47/283 709/231 |
| 2010/0138865 A1* | 6/2010 | Rai | H04N 21/4314 725/44 |
| 2010/0186046 A1* | 7/2010 | Bae | H04N 21/4823 725/56 |
| 2011/0093893 A1* | 4/2011 | Bitar | H04N 21/482 725/39 |
| 2012/0117488 A1* | 5/2012 | Amidon | H04N 21/454 715/753 |
| 2012/0278725 A1* | 11/2012 | Gordon | H04N 21/858 715/738 |
| 2013/0086607 A1* | 4/2013 | Tom | H04N 21/25891 725/32 |
| 2013/0268974 A1* | 10/2013 | Sridhar | H04N 21/84 725/51 |
| 2014/0337888 A1* | 11/2014 | Doan | H04N 21/8543 725/39 |
| 2016/0029082 A1* | 1/2016 | Wordley | H04N 21/812 725/52 |
| 2016/0381110 A1* | 12/2016 | Barnett | H04L 65/601 709/231 |
| 2017/0150220 A1* | 5/2017 | Greene | H04N 21/4147 |
| 2018/0014077 A1* | 1/2018 | Hou | H04N 21/25841 |
| 2018/0124470 A1* | 5/2018 | Kim | H04N 21/4314 |
| 2018/0146240 A1* | 5/2018 | Gratton | H04N 21/4383 |
| 2018/0262806 A1* | 9/2018 | Greene | H04N 21/431 |
| 2019/0069039 A1* | 2/2019 | Phillips | H04N 21/6587 |
| 2019/0182554 A1* | 6/2019 | Schupak | H04N 21/2187 |
| 2019/0199954 A1* | 6/2019 | Choi | H04N 21/472 |
| 2021/0105532 A1* | 4/2021 | Greene | H04N 21/84 |
| 2021/0136458 A1* | 5/2021 | Carney | H04N 21/47202 |

\* cited by examiner

SYSTEMS AND METHODS FOR PROGRAM SOURCE DISPLAY

TECHNICAL FIELD

The present disclosure is related to the field of electronic programming guides and multimedia source display.

BACKGROUND

Electronic programming guides (EPGs) are applications used within multimedia devices, such as digital set-top boxes, smart devices (e.g., smart TVs), and other devices that are capable of displaying multimedia via satellite, broadband, and/or the Internet. An EPG may provide an organizational layout that shows current and scheduled programs for viewing on live TV, available programs to stream via the Internet, and/or programs that have been previously recorded (e.g., using a digital video recorder (DVR)). The programs may be displayed in the EPG, and short summaries/commentaries and/or artwork may accompany the programs.

Many modern smart devices aggregate different multimedia applications. Content from these different applications may be aggregated into an indexed search feed. Applications may include live TV (e.g., from Broadband or Satellite), Internet-streaming applications (e.g., Netflix), and/or recorded content (e.g., stored in a digital video recorder (DVR) database).

When a user searches for a particular program using a universal search feature within a multimedia system, the user is often presented with the program. The user may then select the program, and, if the user has a subscription to a certain source (e.g., application from which the program may be played) from which the program can play, then the program may begin playing. However, a user may never know which source from which the program is playing. This results in confusion regarding the source of the content because the user may never be presented with any indication regarding the source of the content before the program begins playing.

In similar situations, a user may make a selection to be presented with the source (or a list of sources) from which the program may be played. The user must then select which source from which to play the program. Further selections will be required by the user if the user does not have a subscription to a certain source (e.g., application from which the program may be played). This results in a decrease in consumption of content because the user must make multiple selections before any content is played on a device.

In other instances, a program may be presented to a user within a multimedia system, but in order for the program to be played, a user must navigate to the program's source native application. This results in an interruptive user experience that can cause a decrease in the consumption of content, as well as bandwidth overload and battery overuse because of the extra steps requiring the opening of a separate application to play a particular program.

As such, there is an increased need to more efficiently indicate a source from which a program may be played to a user without decreasing the consumption of content. Furthermore, an increased need exists for the ability to select and play a program from a universal over-the-top (OTT) multimedia application without opening a separate application.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
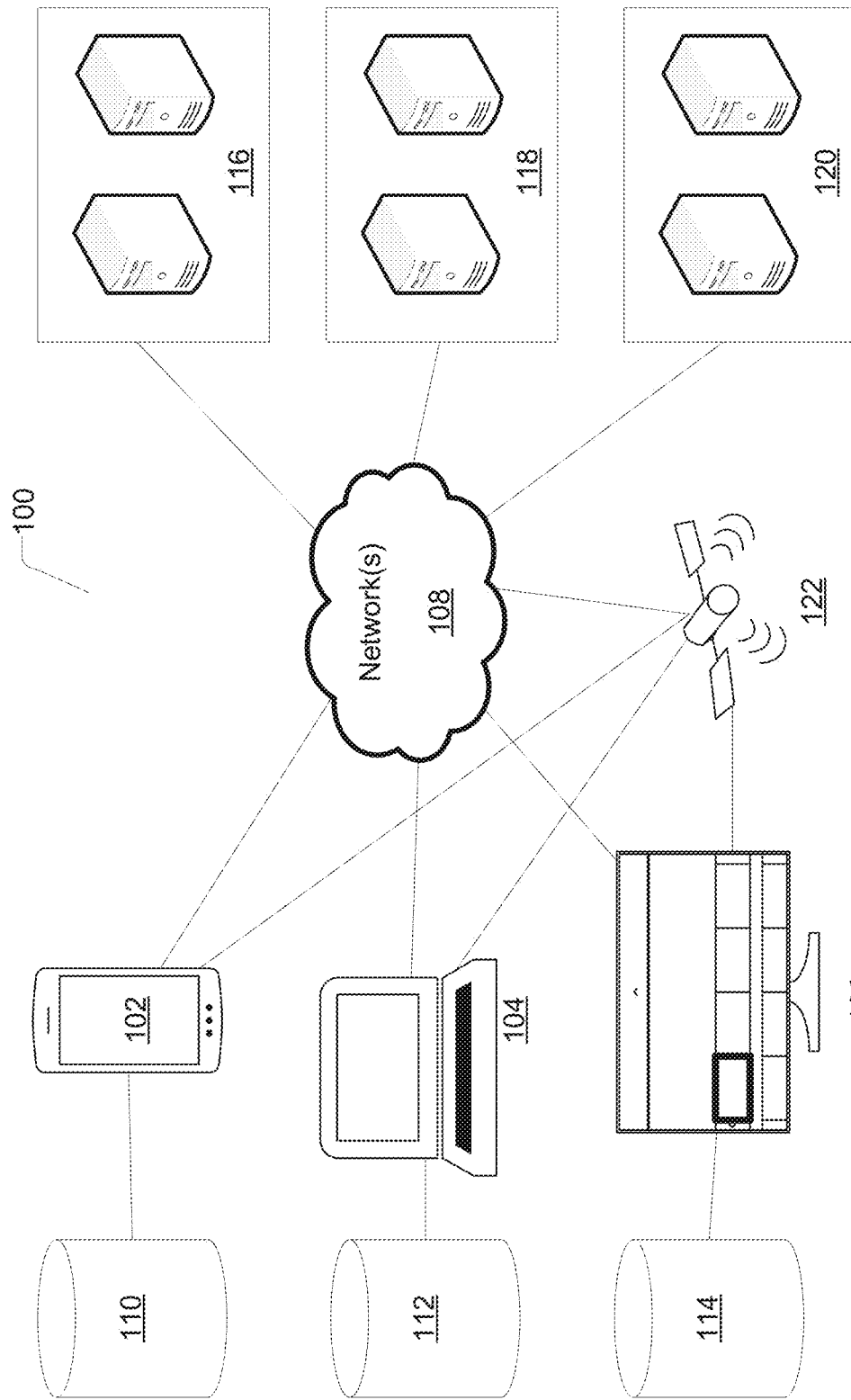
FIG. 1 illustrates an example of a distributed system for displaying a program source, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with displaying a program source without interrupting the consumption of content. In an EPG, a user may browse for different programs. A source indicator may be displayed on a program listing, e.g., as a watermark. The source indicator may display for a fixed duration of time before disappearing. The source indicator may appear as the user scrolls through an EPG list of programs (e.g., scrolling through an OTT EPG that aggregates multiple programs from multiple sources to be viewed in a single user interface).

In some instances, a source indicator may appear on a preview screen upon selection of a program. The source indicatory may appear momentarily before disappearing. In some scenarios, a live preview of a toggled program may begin to play (e.g., in the background or in a separate portion of the display adjacent to the EPG). The source indicatory mark may appear in a location overlaying the live preview so as not to obstruct the content of the underlying preview. For example, if the primary focus of the content of the preview is in the bottom half of the live preview box, then the source indicator may appear in the upper half of the live preview box, and vice versa if the primary focus of the content of the preview is in the top half of the live preview box.

The source of a program within an EPG may be retrieved using metadata associated with the program. For example, metadata identifiers like contentID, mediaType, and sourceID may be passed between the EPG and the native source application. The contentID may identify the program content, and the mediaType may identify the type of media (e.g., Internet-streaming, live TV, previously recorded media in a DVR database, YouTube video, television series, movie, documentary, etc.). The sourceID may identify the source of the program (e.g., Satellite TV network, Internet-streaming provider, etc.).

In some examples, a program may be available to play from multiple sources. In such cases, the systems and methods described herein may analyze the efficiency of playing the program from each of the possible sources. For example, if a certain program may be streamed on-demand from a Satellite TV provider or streamed via Internet via an Internet-streaming provider. If the current tuner utilization in a set-top box configuration is high (i.e., other members of a household are watching Satellite TV), then the system may decide to play the program from the Internet-streaming provider rather than the Satellite TV provider. In other instances, when Internet connectivity may be disrupted, the systems and methods described herein may elect to play the program from the Satellite TV provider. Such load-balancing mechanisms may be implemented to ensure efficient playing/streaming of program content.

Accordingly, the present disclosure provides a plurality of technical benefits including but not limited to: efficient source indication identification without having to navigate to a source application; load-balancing of playing program content based on most source efficiency; enabling consumption of program content through minimizing the number of selections within an EPG; and decreasing interruptions in the broadcast/streaming of program content, which improves overall content distribution among networks (e.g., Internet, broadband, satellite, etc.), among other examples.

FIG. 1 illustrates an example of a distributed system for displaying a source indicator for a program, as described herein. Example system 100 presented is a combination of interdependent components that interact to form an integrated whole for displaying a program source indicator. Component of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to identify and play multimedia programs. In aspects, a client device, such as client devices 102, 104, and 106, may have access to one or more data sources and/or databases comprising multimedia programs. In other aspects, client devices 102, 104, and 106, may be equipped to receive live broadband and/or satellite signals carrying multimedia programs to be displayed on a display device, such as client devices 102, 104 and 106 (i.e., mobile phone 102, personal computer 104, and/or television 106). The signals that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a set-top box that is connected to a display device, such as television 106 (or a television that may have set-top box circuitry built into the television mainframe).

Client devices 102, 104, and 106 may be configured to display a source indicator of a program. Within an EPG, various programs may be displayed. Each program may display a source indicator (e.g., permanently and/or momentarily). Certain metadata based on the program (e.g., contentID, mediaType, and/or sourceID) may be retrieved by client devices 102, 104, and/or 106. The metadata may be transmitted via network(s) 108 and/or satellite 122. The metadata may be stored remotely on servers 116, 118, and/or 120. In other situations, the metadata may be locally stored on databases 110, 112, and/or 114. Such metadata may be associated with particular source indicators. For example, a certain sourceID metadata may cause the systems and methods described herein to display a particular watermark overlaying a program item in an EPG list. The watermark may be an image (e.g., JPEG, PNG, GIF, TIFF, BMP, SVG, APNG, etc.) or other graphic type.

Because satellite 122 and network(s) 108 are configured to communicate with one another, the systems and methods described herein may be able to assess the efficiency of a program source. For instance, the efficiency of a program source may comprise analyzing tuner utilization rate, bandwidth usage, and server load-balancing, among other factors. In one example aspect, a program may be displayed in an EPG, and the program may be played from multiple sources, such as an Internet-streaming service and a satellite TV service. If the current tuner utilization rate of a set-top box is high, then the systems and methods described herein may elect to play the program from the Internet-streaming source. As such, the source indicator that is displayed on the program item (or program preview) may be a source indicator of the Internet-streaming service. If the bandwidth usage is high, then the systems and methods described herein may elect to play the program from the satellite TV service, and the source indicator may indicate the satellite TV service. Such communications between satellite 122 and network(s) 108 allow for load-balancing efficiency. Bandwidth may be decreased and throughput may be increased because the systems and methods described herein are able to determine the most efficient source from which to play certain programs.

Figure 2:
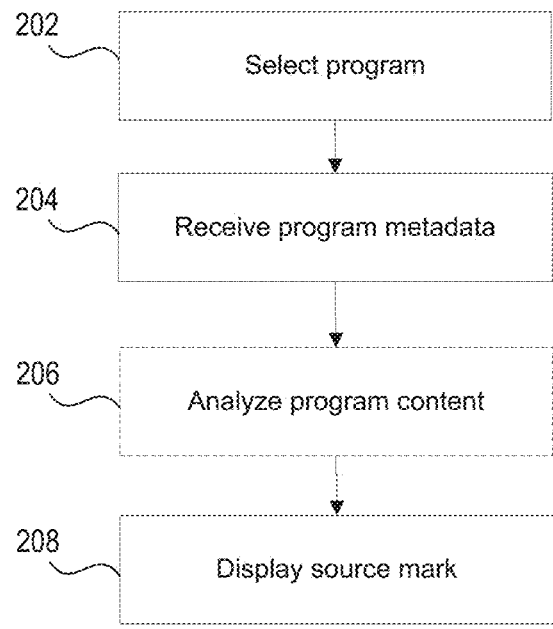
FIG. 2 illustrates an example method for displaying a program source, as described herein.

FIG. 2 illustrates an example method for displaying a program source indicator, as described herein. The method begins with step 202, where a program is selected and/or toggled. While navigating an EPG, a user may select or toggle (e.g., hover over a program item, thereby triggering a highlighting function that shows the user can "select" a program) a program. When the program is selected, metadata associated with that program may be retrieved. As discussed previously, the metadata associated with the program may be retrieved via the Internet (e.g., network(s) 108) and/or satellite (e.g., satellite 122). The metadata associated with a program may comprise information, such as contentID (e.g., identification of the program itself), mediaType (e.g., type of media (television series, movie, live, recorded, streaming, etc.)), and sourceID (e.g., the source of the program). The sourceID associated with the program may determine the source indicator mark that is displayed.

In some example aspects, the source indicator mark may be overlaid on a program item within an EPG. The source indicator mark may be an image (e.g., watermark). The source indicator mark may be displayed for a set period of time (e.g., 2 seconds) and then disappear. In other examples, the source indicator mark may be displayed permanently on the program item. In other aspects, the source indicator marks may display on program items as the user scrolls through an EPG. For instance, when program items are about to be displayed on an EPG, the method may trigger a fetch request to retrieve program metadata so that when the program item appears on the display, the source indicator may appear as well. At step 202, the "selection" of a program may be an internal selection from the systems and methods. For instance, the system may select the programs that are about to appear in a feed of program items on an EPG and retrieve the metadata of those programs prior to displaying the program items. In other instances, a "selection" may be a user selection or toggling of a particular program.

After the program metadata is retrieved, the program content may be analyzed at step 206. Step 206 is optional. When a user selects and/or toggles a program, a live preview of a program may begin playing in a separate portion of the display. A source indicator mark may be displayed in the live preview portion of the display, overlaying the live preview of the program. The source indicatory may be displayed so as to not obstruct the main focus of the content being displayed. For instance, if the focus of the live preview is occurring in the left side of the live preview portion, then the source indicator mark may be displayed on the right side. When the focus of the content changes, the source indicator mark location in relation to the underlying content may also change.

After the program metadata is received at step 204 and (if applicable) the program content is analyzed at step 206, the source indicator mark may be displayed at step 208. As discussed previously, the source indicator mark may be a watermark, such as a translucent image. The source indicator mark may be displayed temporarily or permanently.

Figure 3:
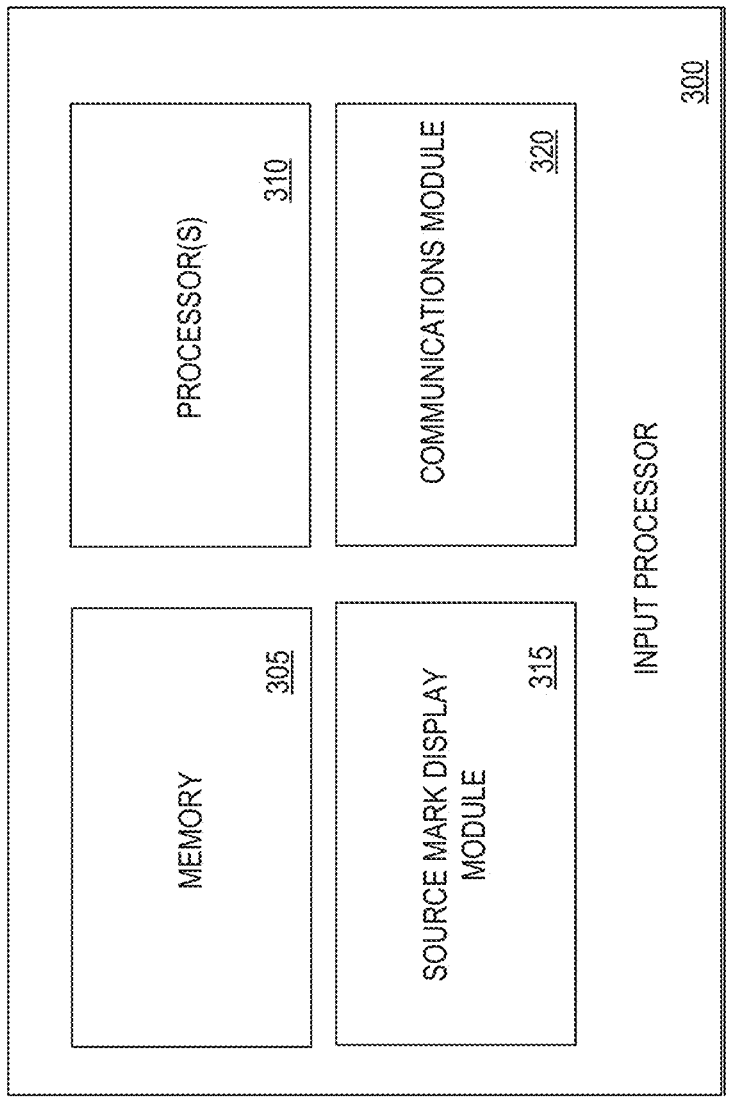
FIG. 3 illustrates an example input processor that is configured to implement the systems and methods described herein.

FIG. 3 illustrates an example input processor that is configured to implement the systems and methods described herein. Input processor 300 may be embedded within a client device (e.g., client devices 102, 104, and/or 106), remote web server device (e.g., devices 116, 118, and/or 120), set-top boxes, televisions, smart televisions, and other devices capable of displaying a program source indicator. The input processing system contains one or more data processors and is capable of executing algorithms, software routines, and/or instructions based on processing data provided by a variety of sources related to the selection of a multimedia item for recording (e.g., intelligently via a machine-learning algorithm and/or manually by a user). The input processing system can be a factory-fitted system or an add-on unit to a particular device. Furthermore, the input processing system can be a general-purpose computer or a dedicated, special-purpose computer. No limitations are imposed on the location of the input processing system relative to a client, remote web server device, television, set-top box, etc. According to embodiments shown in FIG. 3, the disclosed system can include memory 305, one or more processors 310, source mark display module 315, and communications module 320. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 305 can store instructions for running one or more applications or modules on processor(S) 310. For example, memory 305 could be used in one or more embodiments to house all or some of the instructions needed to execute the functionality of source mark display module 315 and communications module 320. Generally, memory 305 can include any device, mechanism, or populated data structure used for storing information. In accordance with some embodiments of the present disclosures, memory 305 can encompass, but is not limited to, any type of volatile memory, nonvolatile memory, and dynamic memory. For example, memory 305 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 305 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 305.

Source mark display module 315 may be configured to run a portion of the operation steps described in FIG. 2. Module 315 may be configured to display a source mark based on metadata received by communications module 320. Module 315 may also be configured to change the display characteristics of the source mark in relation to the programs that are displayed For instance, module 315 may configure the source mark to be more or less translucent, change the color of the source mark, position the source mark in different areas of a screen (e.g., top or bottom half), alter the size of the source mark in relation to the screen and/or live preview box, etc. In other instances, module 315 may receive program content data from communications module 320 that indicate the primary focus of the content within a live preview box and/or screen. For instance, a user may be toggling/hovering over a certain program displayed in a list of programs within the EPG. A live preview of that toggled program may begin to play in the background behind the EPG, and a source mark may be displayed on the live preview. Module 315 may receive metadata and/or content information associated with the program from communications module 320. Based on this information, module 315 may configure the source mark to display in a certain area in relation to the preview of the content. Additionally, different display characteristics of the source mark may be triggered based on the underlying content of the program. For example, the source mark indicator may be the color white when darker backgrounds are present in the program content or the color back when lighter backgrounds are present in the program content.

In yet further examples, module 315 may be configured to determine the most efficient file type to display as the source indicator. As mentioned previously, the program source indicator may be an image or other graphic, e.g., JPEG, PNG, GIF, TIFF, BMP, SVG, APNG, etc. Based on available bandwidth, broadband, and/or cellular usage, the system may determine that certain file types for a source indicator may be more efficient to display than other source indicators. For instance, if bandwidth usage is high, displaying a colorized GIF source indicator may require more memory resources and bandwidth than displaying a black and white JPEG. In other situations when bandwidth and memory usage are of less or no concern, displaying a colorized GIF may be more aesthetically appealing and, as such, displayed as the source indicator.

In other example scenarios, module 315 may receive information regarding user subscriptions and use that information to determine the source from which to play a certain program. For example, if a user toggles a program in an EPG, the program may be available to play from multiple sources. One source may be from a satellite TV subscription, while the other source may be from an Internet-streaming service. If the device is in a household with multiple other devices that may be connected to a satellite TV subscription, the system may analyze the tuner utilization of the set-top box. If multiple people are using the tuners from the set-top box, then the system may determine that it would be a more efficient use of resources to play the program from the Internet-streaming service instead of the satellite TV service. In such a scenario, the source mark will indicate the Internet-streaming service rather than the satellite TV service. In other scenarios where playing the program from the satellite TV service is more efficient than playing the program from the Internet-streaming service (e.g., bandwidth overload), then the source mark indicator will reflect the satellite TV provider instead of the Internet-streaming service provider.

Communications module 320 is associated with sending/receiving information (e.g., collected by source mark display module 315, such as commands received via client devices or remotes, navigation history within the EPG, etc.) with other client devices, remote web servers, set-top boxes, televisions, remotes, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 320 sends information received by program guide display module 315 to client device(s) 102, 104, and/or 106, as well as remote server(s) 116, 118, and/or 120 via network(s) 108 and/or satellite 122. In other examples, communications module 320 may communicate a command to program guide display module 315 that is received from a client device, remote web server, remote, television, and/or other mechanism initiating a command to display, navigate, and/or dismiss an EPG. In yet further examples, communications module 320 may be configured to receive program metadata and program content information via network(s) 108 and/or satellite 122 from remote or local databases. Such information may then be relayed by communications module 320 to source mark display module 315 to determine a location, duration, color, translucence level, and other display characteristics for a source mark.

Figure 4:
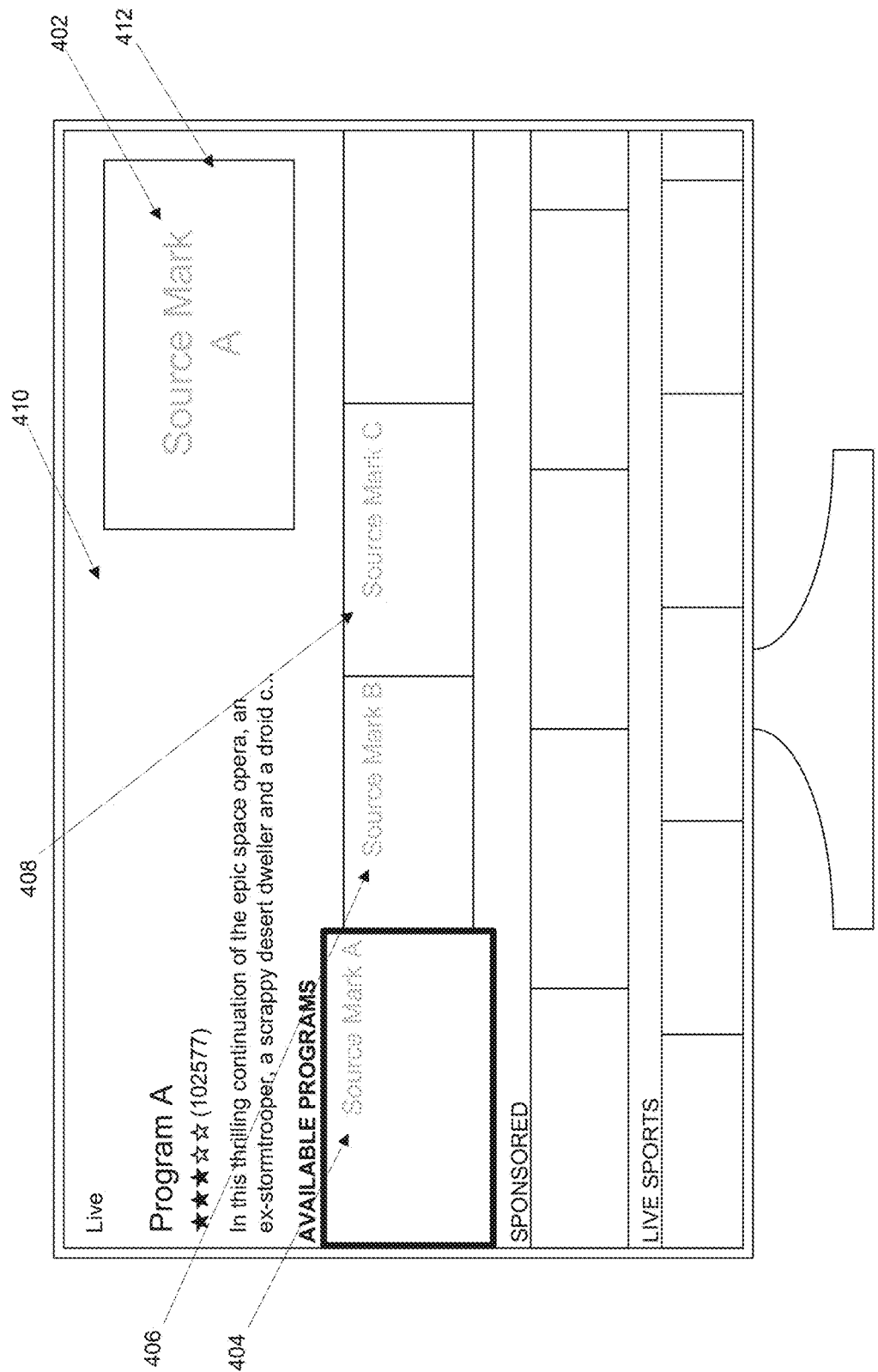
FIG. 4 illustrates an example display device with an electronic program guide.

FIG. 4 illustrates an example display device with an electronic program guide. EPG 410 contains various programs. As illustrated, Program A is selected/toggled. Source Mark 402 is displayed in live preview box 412. Source mark 404 may also indicate the source of Program A in the EPG list of "AVAILABLE PROGRAMS." Source mark 402 and 404 may indicate the source from which Program A can be played. The source may be a satellite TV service provider, an Internet-streaming service provider, and/or a DVR, among other multimedia sources. Upon loading the EPG, the systems and methods described herein may retrieve program metadata indicating the source from which programs may be played. For instance, source mark display module 315 may receive the metadata associated with Program A and display the source mark at source mark location 404 and/or source mark location 402. Live preview box 412 may contain a live preview and/or trailer of Program A. Based on the underlying content that is playing in the live preview box 412, source mark 402 may change display characteristics so as to not obstruct the underlying content. For instance, the translucence level, size, color, location with live preview box 412, duration of display, etc. may change based on where the focus of the content is occurring within live preview box 412.

Other programs in the EPG list may also display source marks, such as source mark 406 and source mark 408 depending on the sources of those programs. Source mark 406 may be the same or different than source mark 404. Source mark 408 may be the same or different than source mark 404. As discussed previously, load-balancing factors may change the source of a program. For example, source mark A for Program A may have two sources—a satellite TV service and an Internet-streaming service. In times of high tuner utilization, source marks 402 and 404 may indicate the Internet-streaming service, whereas in times of high bandwidth usage and low tuner utilization rate, source marks 402 and 404 may indicate the satellite TV service.

Upon selection of a program in the EPG, the EPG may initiate a secondary application to play the selected program. Upon the playing of the selected program, an indicatory identifying metadata associated with either EPG application or the secondary application may be displayed temporarily within the program content. For instance, upon selecting Program A, a secondary application (e.g., source of Program A) may open and begin playing program A. Upon playing Program A, a source mark may be displayed temporarily that identifies the source (e.g., source mark A) and/or the source of the EPG. In some configurations, displaying temporarily includes superimposing a source mark (e.g., image, icon, other identifier, etc.) in either a solid or semi-transparent form over the program content.

Figure 5:
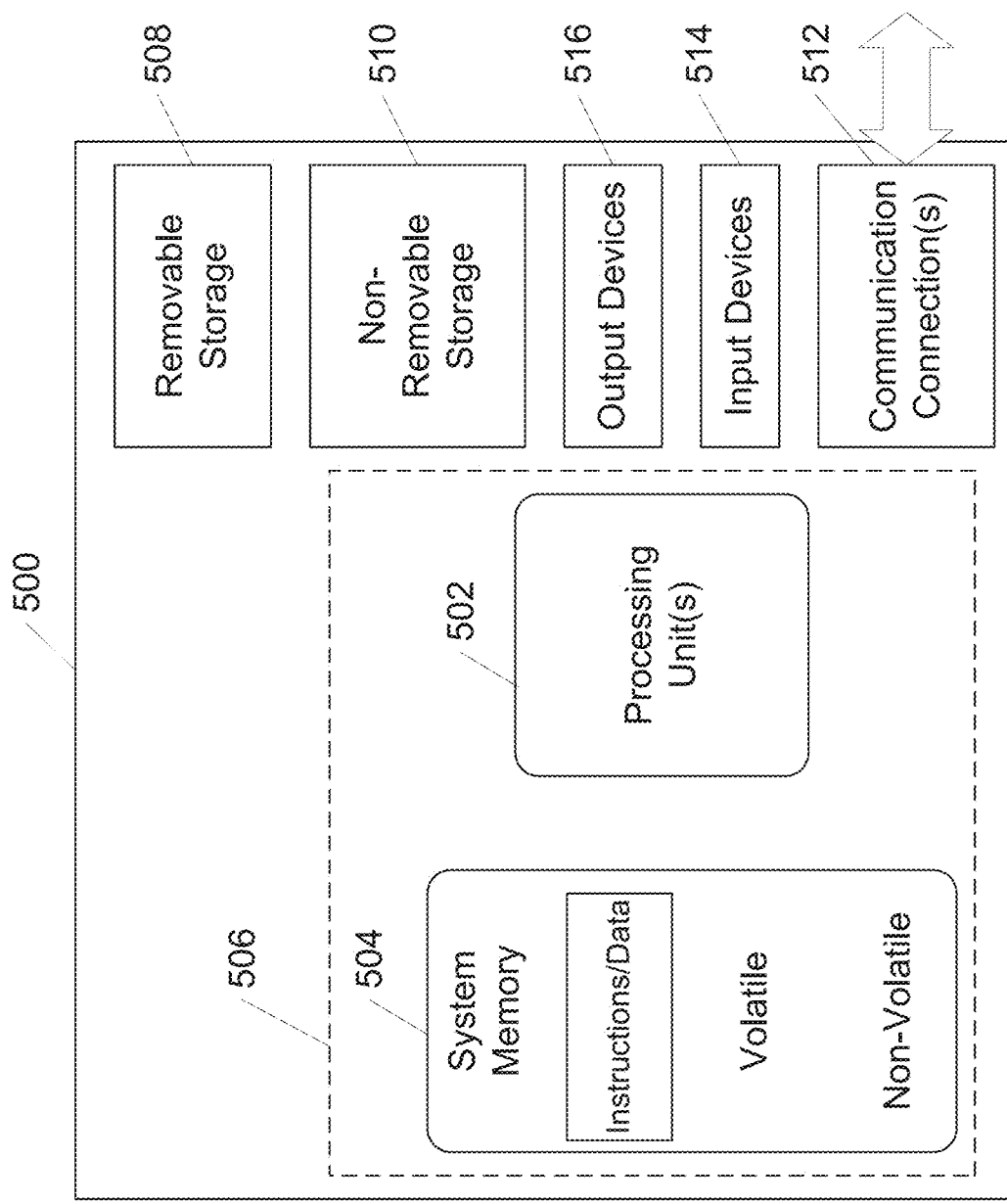
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data.

Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A system for displaying a program source indicator, comprising:
   a memory configured to store non-transitory computer readable instructions; and
   a processor communicatively coupled to the memory, wherein the processor, when executing the non-transitory computer readable instructions, is configured to:
      select a program from a first program source within an electronic programming guide, wherein the program is accessible from the first program source and from a second program source;
      receive metadata associated with the program, wherein the metadata identifies the first program source and the second program source from which the program may be played;
      compare an efficiency of playing the program from the first program source and from the second program source, wherein comparing the efficiency includes a load-balance determination between the first program source and the second program source;
      based on the comparison of the efficiency, retrieve the program source indicator associated with a most efficient service provider, wherein the most efficient service provider is either the first program source or the second program source, and wherein the program source indicator is a graphic associated with the most efficient service provider; and
      display the program source indicator within the electronic programming guide.

2. The system of claim 1, wherein the metadata comprises content information associated with the program.

3. The system of claim 2, wherein the processor is further configured to display the program source indicator based on the content information associated with the program.

4. The system of claim 1, wherein the program is at least one of: a channel, a broadcast media item, a movie, a television show, a video clip, and an Internet streaming media item.

5. The system of claim 2, wherein the processor is further configured to change at least one display characteristic of the program source indicator.

6. The system of claim 5, wherein the at least one display characteristic is at least one of: a translucence level, a color, a size, a font type, a position, a duration of display, and a file type.

7. The system of claim 6, wherein the file type of the program source indicator may be at least one of: JPEG, PNG, GIF, TIFF, BMP, SVG, and APNG.

8. The system of claim 7, wherein the processor is further configured to change the at least one display characteristic of the program source indicator based on the content information associated with the program.

9. The system of claim 1, wherein selecting the program within the electronic programing guide comprises scrolling in a list within the electronic programming guide, wherein the list comprises a plurality of programs.

10. The system of claim 9, wherein the processor is further configured to receive metadata associated with the plurality of programs within the list of the electronic programming guide.

11. The system of claim 1, wherein the first program source and the second program source include at least one of: an Internet-streaming service, a broadband TV service, a satellite TV network, and a DVR.

12. The system of claim 1, wherein the comparison of the efficiency of playing the program from the first program source and from second program source comprises analyzing at least one of: a bandwidth usage, a tuner utilization, and a throughput usage.

13. The system of claim 1, wherein the processor is further configured to select the most efficient service provider based on at least one load-balancing factor.

14. The system of claim 1, wherein displaying the program source indicator is for a temporary time duration.

15. A method for displaying a program source indicator comprising:
toggling a program from a first program source within an electronic programming guide, wherein the program is associated with the first program source and a second program source;
receiving metadata associated with the program, wherein the metadata identifies the first program source and the second program source from which the program may be played and content information associated with the program;
comparing an efficiency of playing the program from the first program source and from the second program source, wherein comparing the efficiency includes a load-balance determination between the first program source and the second program source;
based on the comparison of the efficiency, retrieving the program source indicator associated with a most efficient service provider, wherein the most efficient service provider is either the first program source or the second program source, and wherein the program source indicator is a graphic associated with the most efficient service provider; and
displaying the program source indicator within the electronic programming guide.

16. The method of claim 15, wherein the content information associated with the program comprises a primary focus area.

17. The method of claim 16, wherein displaying the program source indicator comprises displaying the program source indicator in an area opposite of the primary focus area.

18. The method of claim 15, wherein the program comprises at least one of: a channel, a broadcast media item, a movie, a television show, a video clip, and an Internet streaming media item.

19. The method of claim 15, wherein the first program source and the second program source include at least one of: an Internet-streaming service, a broadband TV service, a satellite TV network, and a DVR.

20. A computer-readable media storing non-transitory computer executable instructions that when executed cause a computing system to perform a method for displaying a program source indicator comprising:
selecting a program from a first program source within an electronic programming guide;
receiving metadata associated with the program, wherein the metadata comprises a first source identifier, a second source identifier, and content information associated with the program, wherein the first source identifier identifies the first program source from which the program may be played and the second source identifier identifies the second program source from which the program may be played;
analyzing a usage of playing the program from the first program source and the second program source, wherein analyzing the usage includes a load-balance determination between the first program source and the second program source;
based on the first program source being associated with a lower usage than the second program source, retrieving the program from the first program source; and
displaying the program source indicator within the electronic programming guide, wherein the program source indicator is a graphic of the first source identifier.

* * * * *